US012793016B2

(12) United States Patent
Lin et al.

(10) Patent No.: US 12,793,016 B2
(45) Date of Patent: Nov. 10, 2026

(54) METHOD, APPARATUS, ELECTRONIC DEVICE AND STORAGE MEDIUM FOR VIEW DRAWING

(71) Applicant: Beijing Zitiao Network Technology Co., Ltd., Beijing (CN)

(72) Inventors: Shihong Lin, Beijing (CN); Dachang Liu, Beijing (CN); Weihao Tang, Beijing (CN)

(73) Assignee: Beijing Zitiao Network Technology Co., Ltd., Beijing (CN)

( * ) Notice: Subject to any disclaimer, the term of this patent is extended or adjusted under 35 U.S.C. 154(b) by 13 days.

(21) Appl. No.: 18/866,470

(22) PCT Filed: May 17, 2023

(86) PCT No.: PCT/CN2023/094849

§ 371 (c)(1),
(2) Date: Nov. 15, 2024

(87) PCT Pub. No.: WO2023/222049

PCT Pub. Date: Nov. 23, 2023

(65) Prior Publication Data

US 2025/0328866 A1 Oct. 23, 2025

(30) Foreign Application Priority Data

May 17, 2022 (CN) ......................... 202210541754.2

(51) Int. Cl.

| | |
|---|---|
| ***G06Q 10/10*** | (2023.01) |
| ***G06F 3/0486*** | (2013.01) |
| ***G06F 9/451*** | (2018.01) |

(52) U.S. Cl.

CPC ......... *G06Q 10/103* (2013.01); *G06F 3/0486* (2013.01); *G06F 9/451* (2018.02)

(58) Field of Classification Search

CPC ...... G06Q 10/10; G06Q 10/103; G06F 9/451; G06F 3/0486; G06T 11/20

See application file for complete search history.

(56) References Cited

U.S. PATENT DOCUMENTS

2009/0327020 A1* 12/2009 de Vries ................ G06Q 10/06 705/7.15
2012/0116835 A1* 5/2012 Pope ............... G06Q 10/06316 705/7.26

(Continued)

FOREIGN PATENT DOCUMENTS

CN 102368777 A 3/2012
CN 102567840 A 7/2012

(Continued)

OTHER PUBLICATIONS

A. M. Mulvehill, "A user interface for a knowledge-based planning and scheduling system," in IEEE Transactions on Systems, Man, and Cybernetics, vol. 18, No. 4, pp. 514-521, Jul.-Aug. 1988, doi: 10.1109/21.17369. (Year: 1988).*

(Continued)

*Primary Examiner* — George Chen
*Assistant Examiner* — Tayar M Kyu
(74) *Attorney, Agent, or Firm* — BakerHostetler

(57) ABSTRACT

The present disclosure provides a method, an apparatus, an electronic device, and a storage medium for view drawing. The view drawing method includes obtaining in response to detecting that a view drawing control is triggered, obtaining a target filtering condition; determining target to-be-processed data from project management data corresponding to a target user based on the target filtering condition, wherein the project management data comprises to-be-processed data corresponding to at least one project, and the to-be-processed data comprises project personnel information; and generating a personnel scheduling view based on a target (Continued)

project personnel identifier and schedule information corresponding to the target project personnel identifier in the target to-be-processed data.

18 Claims, 7 Drawing Sheets

(56) References Cited

U.S. PATENT DOCUMENTS

| | | | | |
|---|---|---|---|---|
| 2015/0006232 | A1* | 1/2015 | Anaby-Tavor ... | G06Q 10/06316 705/7.26 |
| 2019/0050811 | A1* | 2/2019 | Kang ................. | G06Q 10/1097 |

FOREIGN PATENT DOCUMENTS

| | | | |
|---|---|---|---|
| CN | 110544069 | A | 12/2019 |
| CN | 110704441 | A | 1/2020 |
| CN | 111460010 | A | 7/2020 |
| CN | 111523761 | A | 8/2020 |
| CN | 112256594 | A | 1/2021 |
| CN | 113159470 | A | 7/2021 |
| CN | 115526954 | A | 12/2022 |
| JP | 2004310273 | A | 11/2004 |

OTHER PUBLICATIONS

Chinese Patent Application No. 202210541754.2; Office Action dated Dec. 23, 2024, 10 pages with machine translation.

Pengfei Sun et al., A Preliminary Analysis of Methods for Strengthening Monitoring Station Management through Project Management in the Information Age, China Radio, Jan. 26, 2020, 6 pages with English abstract.

International Patent Application No. PCT/CN2023/094849; Int'l Search Report; dated Aug. 16, 2023; 2 pages.

* cited by examiner

| APRIL, 2022 | FRI. 4.1 | SAT. 4.2 | ...... | FRI. 4.29 | SAT. 4.30 |
|---|---|---|---|---|---|
| USER A<br>TOTAL NUMBER OF PROJECTS 3<br>TOTAL DURATION 8.0<br>UNSCHEDULED TASK 3 VIEW | | | | | |
| USER B<br>TOTAL NUMBER OF PROJECTS 13<br>TOTAL DURATION 18.0<br>UNSCHEDULED TASK 8 VIEW | | | | | |
| ...... | | | | | |
| USER H<br>TOTAL NUMBER OF PROJECTS 3<br>TOTAL DURATION 4.0<br>UNSCHEDULED TASK 1 VIEW | | | | | |

METHOD, APPARATUS, ELECTRONIC DEVICE AND STORAGE MEDIUM FOR VIEW DRAWING

The present application is a national phase filing of International Patent Application No. PCT/CN2023/094849 filed May 17, 2023, which claims priority to Chinese Patent Application No. 202210541754.2, filed on May 17, 2022, disclosures of which are incorporated herein in their entireties.

FIELD

The present disclosure relates to the technical field of project management, in particular to a method, an apparatus, an electronic device, and a storage medium for view drawing.

BACKGROUND

In a project management system, showing data features by view drawing becomes a currently very common data management mode. In view drawing, it is required to manually input the to-be-processed data, and manually draw the view based on the to-be-processed data. However, the efficiency of manually inputting the to-be-processed data is relatively low, and a large amount of time to complete the view drawing is required.

SUMMARY

The present disclosure provides a view drawing method and device, electronic device, and a storage medium, so that the effect of efficiently and quickly generating a personnel scheduling view is achieved.

An embodiment of the present disclosure provides a view drawing method, including:

- in response to detecting that a view drawing control is triggered, obtaining a target filtering condition;
- determining target to-be-processed data from project management data corresponding to a target user based on the target filtering condition, wherein the project management data comprises to-be-processed data corresponding to at least one project, and the to-be-processed data comprises project personnel information; and
- generating a personnel scheduling view based on a target project personnel identifier and schedule information corresponding to the target project personnel identifier in the target to-be-processed data.

An embodiment of the present disclosure further provides a view drawing apparatus, including:

- a target filtering condition obtaining module, configured to obtain a target filtering condition in response to detecting that a view drawing control is triggered;
- a target to-be-processed data determining module, configured to determine target to-be-processed data from project management data corresponding to a target user based on the target filtering condition, wherein the project management data comprises to-be-processed data corresponding to at least one project, and the to-be-processed data comprises project personnel information; and
- a personnel scheduling view generating module, configured to generate a personnel scheduling view based on a target project personnel identifier and schedule information corresponding to the target project personnel identifier in the target to-be-processed data.

An embodiment of the present disclosure further provides an electronic device, including:

- one or more processors;
- a storage apparatus configured to store one or more programs, and
- when executed by the one or more processors, the one or more programs cause the one or more processors to implement a view drawing method according to any one of the embodiments of the present disclosure.

An embodiment of the present disclosure further provides a computer-readable storage medium having a computer program stored thereon, where the computer program, when executed by a processor, implements a view drawing method according to any one of the embodiments of the present disclosure.

DETAILED DESCRIPTION

Embodiments of the present disclosure will be described below with reference to the accompanying drawings. While some embodiments of the present disclosure are shown in the accompanying drawings, the present disclosure may be embodied in a variety of forms, and should not be construed as being limited to the embodiments set forth herein. On the contrary, these embodiments are provided for a more thorough and complete understanding of the present disclosure. The drawings and embodiments of the present disclosure are for illustrative purposes only and are not intended to limit the scope of the present disclosure.

It shall be understood that the various steps described in the method implementation of this disclosure can be executed in different orders and/or in parallel. In addition, the method implementation can include additional steps and/or the steps as shown may be omitted. The scope of this disclosure is not limited in this respect.

As used herein, the term "comprising" and deformation thereof are non-exclusive inclusion, i.e., "including but not limited to". The term "based on" means "at least partially based on". The term "one embodiment" indicates "at least one embodiment"; the term "another embodiment" indicates "at least one additional embodiment"; and the term "some embodiments" indicates "at least some embodiments". Relevant definitions of other terms will be given in the following description.

Concepts such as "first" and "second" mentioned in this disclosure are merely used to distinguish different devices, modules, or units, and are not intended to limit the order or interdependence of the functions performed by these devices, modules, or units.

Modifications to "a" and "a plurality of" mentioned in this disclosure are illustrative, but not limiting, unless otherwise indicated in the context, they should be understood as "one or more".

The names of messages or information interaction between multiple devices in embodiments of the present disclosure are described for illustrative purposes only and are not intended to limit the scope of such messages or information.

Before the technical solution is introduced, the application scenario may be described as an example. Based on this technical solution, application software or a display page, such as a Hypertext Markup Language 5.0 (H5) page, may be developed, so that the application software or the display page can implement a view drawing function. The technical solution can also be integrated in a project management platform or system, and project views are generated according to project data in project platforms or system, so that platform users can view the project views. For example, a platform user participates in at least one project, when he/she wants to know project personnel and scheduling arrangement of various projects, a personnel scheduling view can be generated quickly and efficiently based on the solution of the embodiments, which is convenient for users to view.

Figure 1:
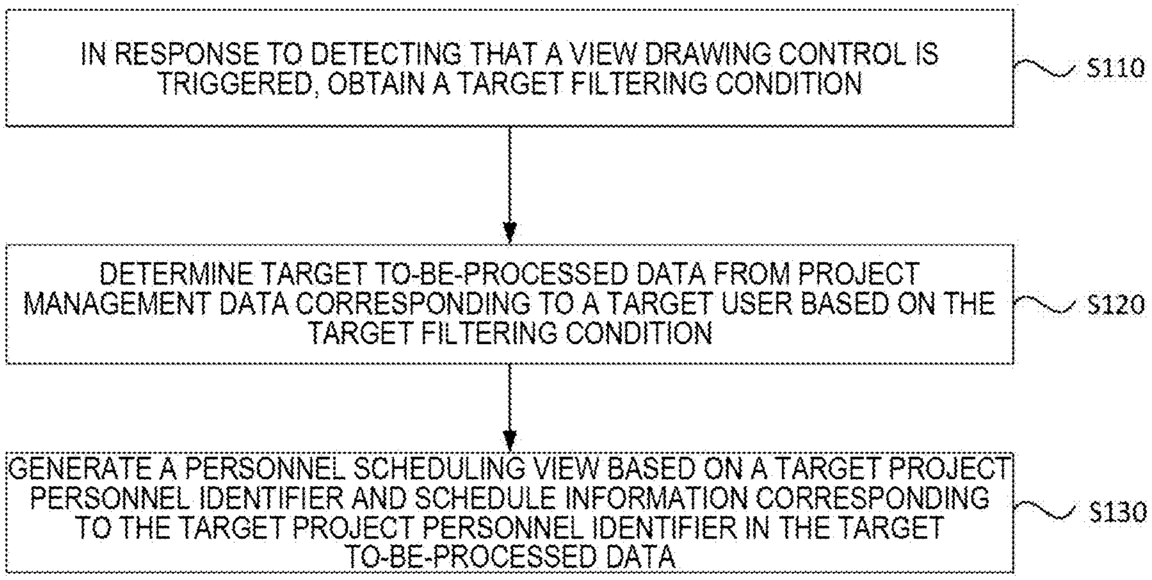
FIG. 1 is a schematic flowchart illustrating a view drawing method provided by an embodiment of the present disclosure.

FIG. 1 is a schematic flowchart illustrating a view drawing method according to an embodiment of the present disclosure. This embodiment may be applied to a case in which a corresponding view is generated on an application interface or a display page based on display data, and the method may be performed by a view drawing apparatus, and the apparatus may be implemented by using software and/or hardware, and may be configured in a terminal and/or a server to implement the view drawing method in the embodiments of the present disclosure.

As shown in FIG. 1, the method in this embodiment may include the following steps.

At S110, a target filtering condition is obtained when detecting that a view drawing control is triggered.

The view drawing control is configured to enable a view drawing function when being triggered. For example, the view drawing control may be a key containing a "view drawing control" typeface, and the key shape may be a rectangle, a circle, a star, or the like; the view drawing control may also be an icon including animation information of the view drawing action, through which a function of the view drawing control drawing a personnel scheduling view is shown vividly on the display interface of the project management platform or system, so as to enable the function based on a triggering operation.

In an embodiment, the triggering operation for the view drawing control may be performed in a variety of ways. For example, the triggering operation for the view drawing control may be implemented in at least one of a voice control manner, a peripheral device control manner, a touchscreen control manner, and a gesture control manner. For example, the peripheral device may include a mouse, and when the view drawing control is shown in a form of a rectangular key, in response to detecting a clicking operation on a rectangular control from a mouse, it may be determined that the view drawing control is triggered; or when a voice instruction is recognized, it may be determined that the view drawing control is triggered; or when it is detected that the touch screen is clicked and the click position is at the key position where the view drawing control is shown, it is determined that the view drawing control is triggered.

In an actual application process, in addition to the direct triggering operation directly acting on the view drawing control, the view drawing control may be indirectly triggered when performing other associated operations. For example, in the project management platform or system, it is predefined that, when it is detected that the "Project time consumption statistics control" is triggered, the personnel scheduling view of a project needs to be displayed while the project time consumption data needs to be shown; then both the "Project time consumption statistics control" and the "View drawing control" need to implement the function of displaying the personnel scheduling view, that is, they are associated controls. When the triggering operation acting on the "Project time consumption statistics control" is detected, the "View drawing control" is indirectly triggered, and the function corresponding to the view drawing control can be enabled.

In this embodiment, the target filtering condition is a condition for filtering out the target to-be-processed data from all the data. The method for obtaining the target filtering condition may include: when detecting that a view drawing control is triggered, determining whether the target user has input a filtering condition in advance, and if the target user has entered the filtering condition, determining input content as the target filtering condition; and if the target user has not input a filtering condition, taking the filtering condition set by the system by default as the target filtering condition. For example, the filtering condition set by default may include showing a scheduling of respective personnel for all the projects in all time period; or may also be showing a scheduling of respective personnel for the ongoing project in a future time period, and the like. Here, the scheduling of respective personnel may refer to a scheduling of each person, or may refer to a scheduling of one or more persons.

In the process of inputting the filtering condition by the target user, the input provided to the target user may be implemented in a plurality of ways, for example, the input box may be directly shown in the display interface to facilitate the user to input the filtering condition; the filtering condition set by the target user may be input into the project management platform or system by importing filtering condition text; or, when it is detected that a filtering condition input control is triggered, an editing interface is popped up to facilitate the user to input the filtering condition; or when the control associated with the filtering condition input operation is triggered, a filtering condition editing page is popped up.

In this embodiment, the target filtering condition includes a personnel scheduling filtering condition. The target to-be-processed data for completing personnel scheduling the personnel is determined by the personnel scheduling filtering condition. Therefore, after the personnel scheduling control is triggered, the filtering condition editing page can be popped up for inputting the target filtering condition. Optionally, after detecting the view drawing control being triggered, and before obtaining the target filtering condition, the filtering condition editing page is popped up when detecting a personnel scheduling control on a display interface being triggered, the editing page includes at least one editing control; the text content edited in the at least one editing control is obtained, and the target filtering condition is generated based on the text content.

The personnel scheduling control is used for generating a personnel scheduling view when being triggered; a project user includes a user meeting a target filtering condition; the filtering condition editing page is configured for editing a target filtering condition to determine target to-be-processed data from the project management data through a target filtering condition; the editing control may include at least one of the following control: an input box, a selection key, a scroll bar and a pull-down menu; the editing control is edited to obtain text content corresponding to the editing operation; and the target filtering condition is composed of the text content.

The target filtering condition may include any type of content recorded in the project management platform or system. Optionally, the target filtering condition includes at least one of a project name, a time period, a schedule user, a user identifier, and a role type.

The schedule user is a user participating or managing a project and needs to be displayed in the personnel scheduling view; the user identifier may include a user code of the user; and the role type includes a worker type in each stage of a project, such as at least one type of sales personnel, research and development personnel, a test personnel, and a quality control personnel.

For example, the input box may be used as an editing control in the editing page, and at least one of a project name, a time period, a schedule user, a user identifier, and a role type that expected to be scheduled by the target user may be directly input into the input box, and the target filtering condition is formed by the content input to the input box.

Figures 2, 3:
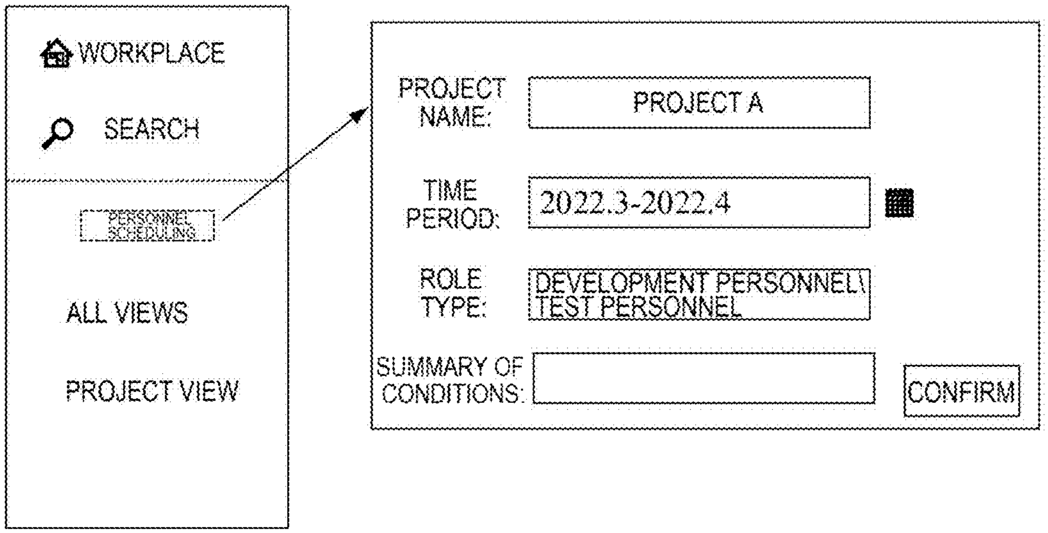
FIG. 2 is a schematic diagram illustrating editing a filtering condition on an editing page provided by an embodiment of the present disclosure.
FIG. 3 is a schematic diagram illustrating a personnel scheduling view provided by an embodiment of the present disclosure.

For example, referring to FIG. 2, the interface includes control such as "workplace", "search", "personnel scheduling", "all views", and "project view", and when detecting a personnel scheduling control on the display interface being triggered, a filtering condition editing page is popped up, "Project A" is input into a project name input box in the editing page; "2022.3-4" is input into a time period input box, or the time period may also be selected through a calendar control provided after the input box; "Developers and testers" are input into a role type input box. The content input by respective input boxes being simultaneously met may be taken as the target filtering condition, to obtain the combined target filtering condition as "Personnel scheduling of respective developers and testers for project A during 2022.3-2022.4"; the "Personnel scheduling of respective developers and testers for project A during 2022.3-2022.4" is directly input in the summary input box of the editing page, and after the "OK" key is clicked, the corresponding target filtering condition is directly generated.

Alternatively, optional content keys may also be used as editing controls on the editing page, that is, respective optional content keys corresponding to at least one type of the project name, the time period, the schedule user, the user identifier, and the role type are displayed on the editing page, such as optional content keys for project name are project A key, project B key and project C key, and the project A key, the project B key and the project C key may be shown on the editing page. With respect to optional content for the scheduling user, the user identifier, and the role type, the same operation may be adopted, so that the content is directly listed on the editing interface for selection; with respect to optional content for the time period, it may be shown through a control in the form of a calendar, and when the target user selects a period of time or several periods of time in the calendar, the selected time period in the target filtering condition is correspondingly determined. When various types of optional content keys are displayed on the editing page, the optional content keys may be displayed directly on the interface; or when there are more pieces of optional content, in order to ensure a clean and concise interface, the optional content keys may be displayed in a pull-down menu manner.

Alternatively, an optional box is used as an editing control for the editing page, optional content text corresponding to the project name, the time period, the schedule user, the user identifier, and the role type is directly displayed on the editing page, and optional boxes of a shape such as "□" or "○" are set before the optional content text, and the corresponding optional content is selected by clicking an optional box; for the selected optional content, a "√" symbol may be displayed in the optional box or the optional box is filled with a predetermined color; or it may also set during development stage, the selection operation may be completed by directly clicking each optional content, and for the selected optional content, the optional content may be annotated by bolding, highlighting or other predetermined manners.

In this embodiment, the text content edited in the editing control may be determined, for example, text content input to the input box, text content selected by clicking a key, and corresponding text content checked through the optional box, etc.; and the target filtering condition is generated based on the text content. For example, the edited text content may be used as a part of the target filtering condition, and the content formed when respective text content requirements are met at the same time is used as the target filtering condition. For example, in the text content edited by the editing control, the project name is "project A", the time period is "2022.3-2022.4", the role type is "developer" and "tester", and the obtained target filtering condition is that the "Personnel scheduling of respective developers and testers for project A during 2022.3-2022.4".

At S120, target to-be-processed data is determined from the project management data corresponding to the target user based on the target filtering condition.

The target user may be a user who registers the software and is currently logging in the software. The project management data may be some data bound to a target user account, that is, data with an operating permission.

The target user may manage multiple groups of data based on the application software, and the multiple groups of data may be project data of projects that the user participates in, or project data managed by the user; or data of conferences that the user participates in. Alternatively, the application software may be linked with other application software to retrieve corresponding data from other data associated software for processing, to generate a view corresponding to the target to-be-processed data.

Optionally, the project management data further includes project personnel information of personnel that needs to be involved in each project; project personnel information mainly includes project personnel identifiers, schedule information regarding project processing, project process nodes that the project personnel is responsible for, and corresponding roles of project personnel in the project, for example, an Android engineer, an iPhone Operating System (IOS) engineer, and a test engineer.

In an embodiment, data satisfying the target filtering condition may be determined from the project management data as the target to-be-processed data. The target to-be-processed data includes target project personnel information, and the target project personnel information includes a target project personnel identifier and schedule information corresponding to the target project personnel identifier. By way of example, the target project personnel identifier may be a work code of the target project personnel; and the schedule information corresponding to the target project personnel includes at least one of the historically completed schedule information, the currently executed schedule information, and the scheduled but uncompleted schedule information of the target project personnel. The schedule information may include schedule of all projects in which the target project personnel is involved, or the schedule of projects in which only the target project personnel and a target user are involved.

At S130, a personnel scheduling view is generated based on a target project personnel identifier and schedule information corresponding to the target project personnel identifier in the target to-be-processed data.

The schedule information includes date information and task information corresponding to each piece of date information, and the target project personnel identifier, the date information and the task information corresponding to each piece of date information may be displayed in a personnel scheduling view. For example, the personnel scheduling view may be shown in at least one of a tabular form, a histogram form, a bar chart form, a box-type map form, a function coordinate graph, and a fan-shaped map form.

In order to make the personnel scheduling view clearer and concise, the personnel scheduling view can be shown in a tabular form, and the personnel scheduling view is generated in a tabular form based on the target project personnel identifier and corresponding the schedule information in the target to-be-processed data. An implementation of generating the personnel scheduling view includes: obtaining the target project personnel identifier and the schedule information in the target to-be-processed data; taking date information as a column header of the personnel scheduling view, and taking respective target project personnel identifiers as a row header of the personnel scheduling view; and generating the personnel scheduling view based on the row header, the column header and the schedule information.

In this embodiment, the project information is information such as a project name, a project number, a project type, a project time limit, and a project responsible person related to projects included in the schedule information; the date information includes information of year, month, and day, and may further include a week number corresponding to each day.

In an embodiment, the date information and the target project personnel identifier may be respectively used as headers of the personnel scheduling view, and the schedule information is correspondingly displayed according to the date information and the target project personnel identifier. For example, the date information is used as a column header of the personnel scheduling view, and each target project personnel identifier is used as a row header of the personnel scheduling view.

In order to facilitate the target user to comprehensively grasp the schedule information of the target project personnel, at least one target project personnel identifier may be shown in the row header in the same personnel scheduling view, so as to better understand the project working condition corresponding to respective target project personnel. Optionally, the row header further includes: the total number of projects that the target project personnel participate in, a total duration of the schedule information, and the number of non-scheduled projects.

The total number of projects represents the total number of projects that need to be scheduled in a specified time range, and may include the total number of currently uncompleted projects that target project personnel participate in, the number of all projects that target project personnel have participated in, and a total number of projects related to the target user. The total duration of the schedule information represents a total estimated time of scheduling requirements within a specified time range, which may include the total duration of at least one of uncompleted schedules, completed schedules, and all schedules of the target project personnel; and the number of non-scheduled projects is the number of projects that are not scheduled for the project personnel in the working time period, that is, the number of to-be-processed projects.

The date information is used as the column header of the personnel scheduling view, so that the target user can know the situation from the entire period, and the schedule content corresponding to refined time of target project personnel may be grasped as well. Before the personnel scheduling view is generated, the date information can be shown according to the column header display unit preset by the target user. For example, the row header display unit may include an hour, a day, a week, and a month, for example, when the target user preset a week as a row header display unit, the minimum showing precision is week, and the date information is divided by week to integrally show a weekly schedule; and when the target user preset hour as the row header display unit, the minimum showing precision is hour, and the date information is divided by hour, so as to finely show the schedule state of each hour.

For showing the personnel scheduling view in a more detailed and clear way, referring to FIG. 3, the column header in a grid table shown in the view represents date information for the period of April 2022, the column header represents the date information for April being divided by days, which is the minimum display unit, and the week number corresponding to days is displayed, so that the personnel scheduling in each day can be shown; or whether the day is a holiday or a weekday can be displayed in the column header, so that the progress of the project can be better managed. As shown in FIG. 3, the row header includes a user name, a total number of projects participated or managed by each user, a total duration, and an unscheduled task, and a detail display page may be popped up by triggering a "view" control, where information such as an actual demand content corresponding to the total number of projects, a breakdown of the time spent on each task corresponding to the total time, and the actual content of the unscheduled tasks, and so on. By way of example, schedule information corresponding to each target project personnel identifier is displayed in the middle of the table, and the schedule information may be displayed by adopting an image display manner and/or a text display manner.

In this embodiment, it may be set that, when it is detected that a target project personnel identifier displayed in any one or more of the row headers is selected, the schedule information corresponding to the selected target project personnel identifier is marked in the personnel scheduling view, for example by highlighting, by adopting a color that distinguishes it from the schedule information corresponding to the unselected personnel identifiers, by bolding, and the like. In this way, the target user can conveniently view the desired schedule information, and the diversified display requirements of the target user can be met.

According to the technical solution of the embodiment of the present disclosure, when detecting that a view drawing control is triggered, it is indicated that a drawing function for the personnel scheduling view needs to be enabled, the target filtering condition can be obtained, and target to-be-processed data is determined from project management data corresponding to the target user according to the target filtering condition, so that support data required for generating the personnel scheduling view is obtained, and the to-be-processed data does not need to be manually imported. The project management data includes the to-be-processed data corresponding to the at least one project, the to-be-processed data includes project personnel information, the target project personnel information can be determined through the target to-be-processed data, the target project personnel information may include the target project personnel identifier and the schedule information corresponding to the target project personnel identifier, and the personnel scheduling view can be quickly generated based on the target project personnel identifier and the schedule information corresponding to the target project personnel identifier in the target to-be-processed data. According to the embodiment of the present disclosure, the problem of laborious and time-consuming in the related technology is solved, and the effect of efficiently and quickly generating a personnel scheduling view is realized.

Figure 4:
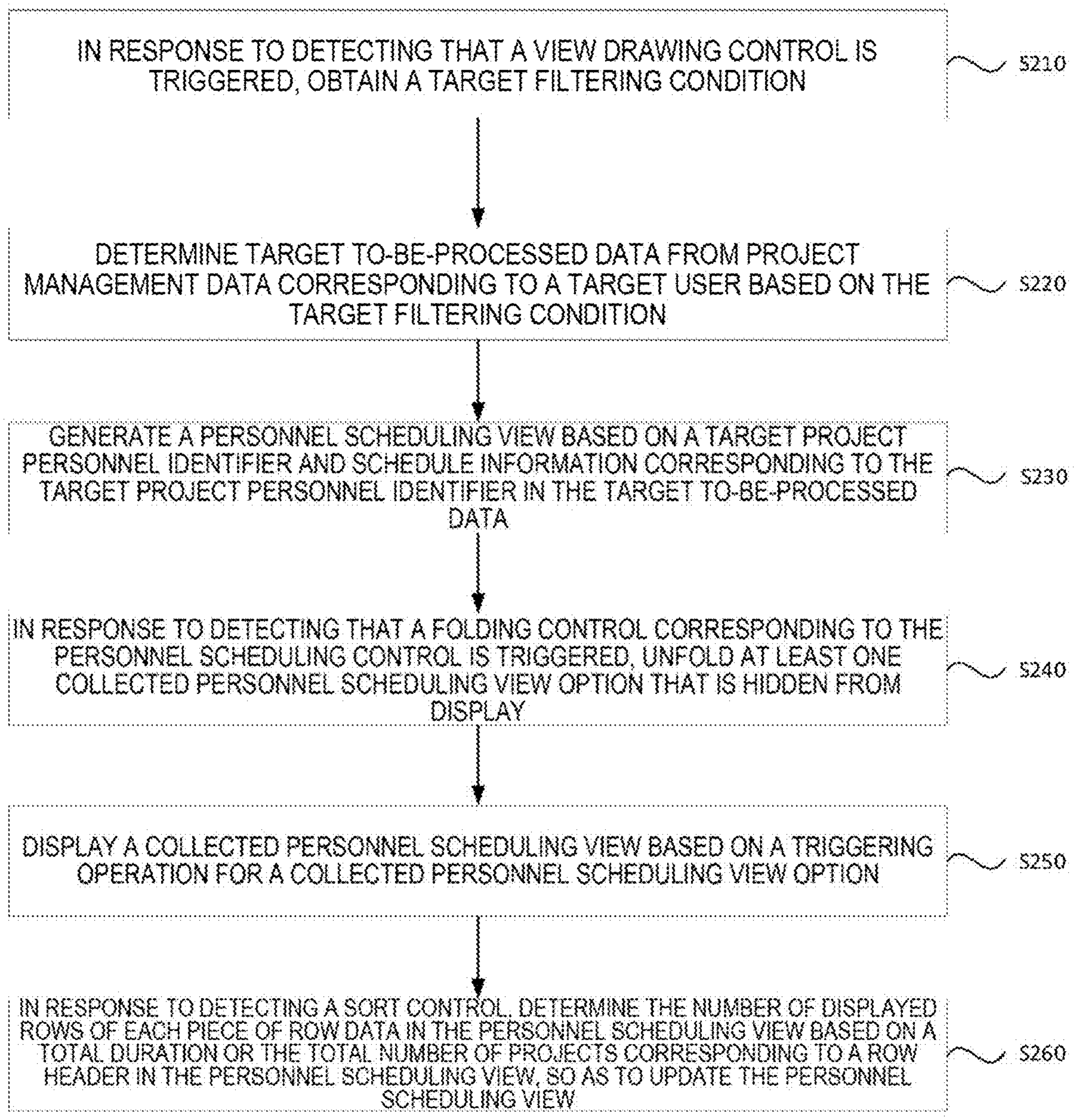
FIG. 4 is a schematic flowchart illustrating a view drawing method provided by an embodiment of the present disclosure.

FIG. 4 is a schematic flowchart illustrating a view drawing method according to an embodiment of the present disclosure. Based on the foregoing embodiment, after determining the view, corresponding information may be displayed based on a triggering operation for view content, and the implementation manner may refer to the technical solution in this embodiment. Technical terms that are the same as or corresponding to the foregoing embodiments are not described herein again.

As shown in FIG. 4, the method includes the following steps.

At S210, in response to detecting that a view drawing control is triggered, obtain a target filtering condition.

At S220, determine target to-be-processed data from project management data corresponding to a target user based on the target filtering condition.

At S230, generate a personnel scheduling view based on a target project personnel identifier and schedule information corresponding to the target project personnel identifier in the target to-be-processed data.

At S240, in response to detecting that a folding control corresponding to the personnel scheduling control is triggered, unfold at least one collected personnel scheduling view option that is hidden from display.

The folding control is configured for hiding two or more views corresponding to the personnel scheduling from display, the views may be, for example, a collected personnel scheduling view, an uncollected personnel scheduling view, all views, a personnel scheduling view for development stage, and a personnel scheduling view for test stage.

In an embodiment, the folding control may be displayed in the interface corresponding to the personnel scheduling control, and may be represented by a triangle, an arrow, a circle or a rectangular box. The folding control corresponding to the personnel scheduling control can be triggered by a clicking operation, and when the folding control is not triggered, content such as a collected personnel scheduling view, an uncollected personnel scheduling view, all views, a personnel scheduling view for development stage, and a personnel scheduling view for test stage that are associated with the personnel scheduling are hidden from display. When it is detected that the folding control is triggered, respective pieces of view content associated with the personnel scheduling control may be directly unfolded, and the view content includes at least one collected personnel scheduling view option.

By way of example, when the folding control is triggered, the folding control corresponding to the collected scheduling view may be shown, and when the folding control corresponding to the collected scheduling view is triggered, a collected personnel scheduling view option that has been hidden is unfolded to be displayed again. For example, after the folding control corresponding to the personnel scheduling control is triggered, the folding control for the "collected scheduling view" and the folding control for "uncollected scheduling view" are unfolded to display, and when it is detected that the folding control for the "collected scheduling view" is triggered, the collected "View A" and "View B" that are hidden are directly unfolded.

At S250, display a collected personnel scheduling view based on a triggering operation for a collected personnel scheduling view option.

In an embodiment, a basic operation such as clicking, dragging, sliding and the like may be used as the triggering operation for the collected personnel scheduling view option, and when it is detected that the triggering operation is completed, the corresponding collected personnel scheduling view may be displayed at a corresponding position of the display interface.

Figure 5:
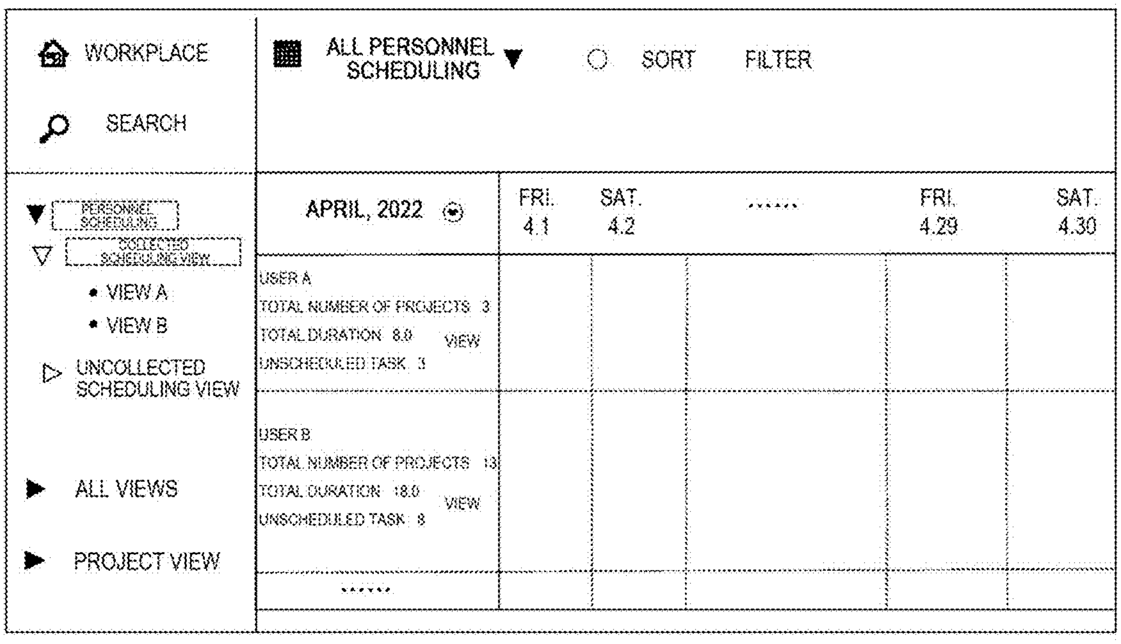
FIG. 5 is a schematic diagram illustrating a project management interface provided by an embodiment of the present disclosure.

In order to more clearly understand positions and purposes of controls on the project management interface, taking FIG. 5 as an example for description, the interface of FIG. 5 includes options such as a workplace and a search, and the top of the interface includes a collection control, a sort control and a filter control, wherein the collection control is represented by a "○" shape, clicking the collection control may implement a function of collecting the personnel scheduling view shown on the current page, and each of the collected personnel scheduling view options is displayed in a list of collected scheduling views shown in a column on the left side of the interface, and "○" may be filled with a predetermined color to indicate that the current view has been collected; and the collection of the current view may be canceled by clicking the collection control identifier again. In the project management interface, various view types are shown in the left column, such as personnel scheduling, all views and project views, and the left side of each view type is provided with folding control with a "▶" shape, and after clicking the corresponding view type, the folding control can be triggered. After the view type of "Personnel scheduling" is clicked, it is equivalent to triggering a corresponding folding control, and then the two controls "Collected scheduling view" and "Uncollected scheduling view" that are hidden from display are unfolded. For the left side of the collected scheduling view and the uncollected scheduling view, a folding control with a "▷" shape may be provided, and the corresponding folding control may be triggered by clicking the corresponding scheduling type, then, for example, by clicking the "Collected scheduling view", the two collected scheduling view options "View A" and "View B" that are hidden from display may be unfolded again, and the corresponding scheduling may be shown on the right side of the view by selecting anyone of collected scheduling view options.

At S260, in response to detecting a sort control, determine the number of displayed rows of each piece of row data in the personnel scheduling view based on a total duration or the total number of projects corresponding to a row header in the personnel scheduling view, so as to update the personnel scheduling view.

The sort control includes two types of sorting, i.e., sorting in ascending order and sorting in descending order, and the sorting manner is determined to be ascending or descending based on the type of the sort control being triggering. By sorting according to the total duration or the total number of projects, the workload and the working duration of each project user can be clearly understood, the comparison between working conditions of the target users can be efficiently and quickly realized through the shown views after sorting, and the convenience of operations of the target users is improved under the application scenarios such as working condition evaluation.

Figure 6:
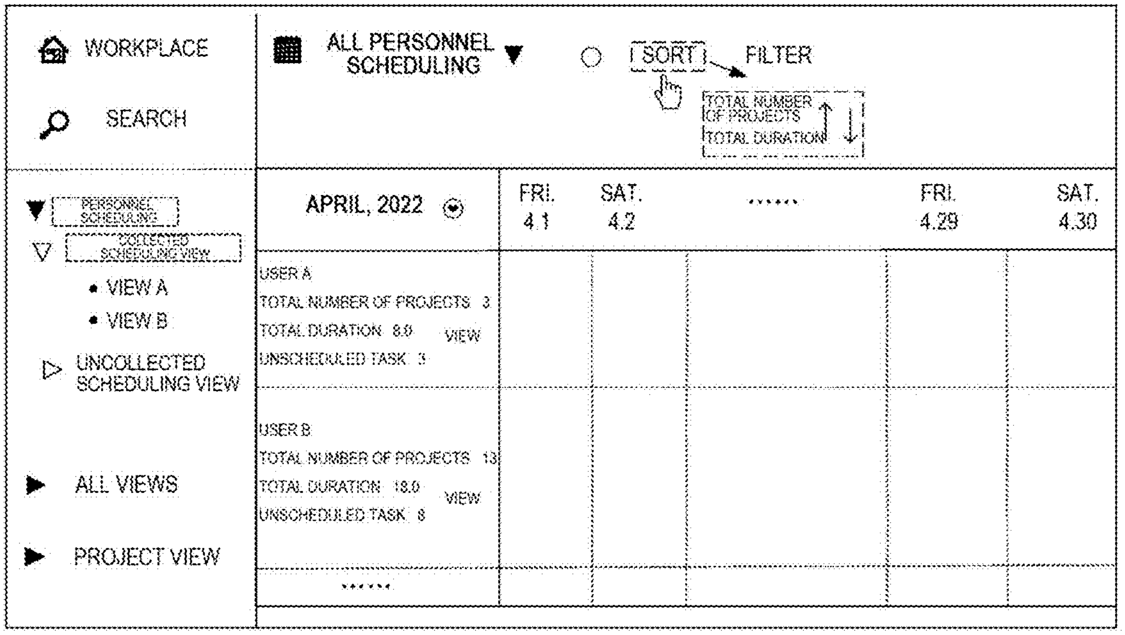
FIG. 6 is a schematic diagram illustrating sorting provided by an embodiment of the present disclosure.

For example, as shown in FIG. 6, a "Sort" control is shown at the top of the display interface, and when a click operation of clicking the "Sort" control is detected, the sort control is triggered, an option pop-up window may be popped up. There are two options of "total duration" and "total number of projects", and the option pop-up window further includes an ascending sort control of an upward arrow shape and a descending sort control of a downward arrow shape. Row data in the personnel scheduling is sorted based on the selected options and the selected ascending or descending sort control, so as to determine the displayed row number of the row data in the personnel scheduling view and update the personnel scheduling view.

According to the technical solution provided by the embodiment of the present disclosure, the collected personnel scheduling view is hidden from display through the folding control, the occupied space of the interface are saved by hiding from display, and the cleanness and conciseness of the interface are provided; and the collected personnel scheduling views are uniformly displayed in a folded way, which can be conveniently found by the target user. According to the technical solution provided by the embodiment of the present disclosure, each piece of row data in the personnel scheduling view can be sorted through the total duration or the total number of projects, so that the project work of respective personnel can be seen at a glance, which is easy to compare and view, and thus improving the convenience of the target user in understanding the project situation.

Figure 7:
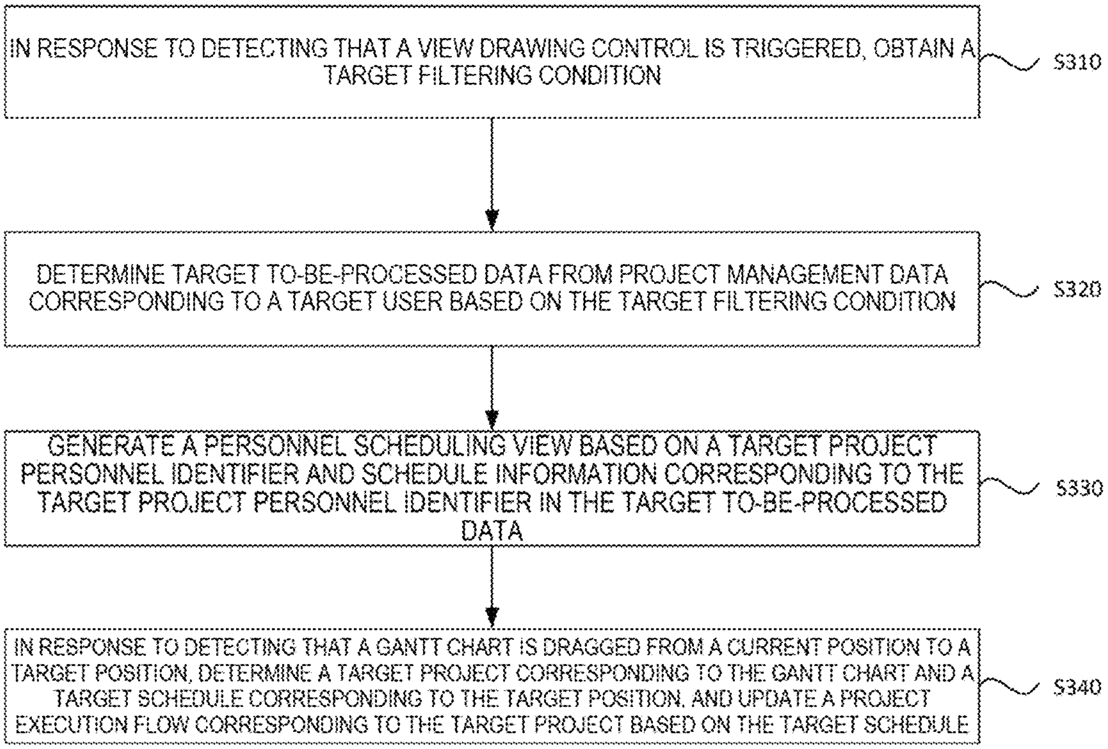
FIG. 7 is a schematic flowchart illustrating a view drawing method provided by an embodiment of the present disclosure.

FIG. 7 is a schematic flowchart illustrating a view drawing method according to an embodiment of the present disclosure; on the basis of the foregoing embodiment, each piece of schedule information in the personnel scheduling view is represented in a Gantt chart form; and a target project corresponding to the Gantt chart and a target schedule corresponding to the target position may be determined by dragging the Gantt chart from the current position to the target position, and the project execution flow corresponding to the target project is updated based on the target schedule. For implementation, reference may be made to the technical solutions in this embodiment. Technical terms that are the same as or corresponding to the foregoing embodiments are not described herein again.

At S310, in response to detecting that a view drawing control is triggered, obtain a target filtering condition.

At S320, determine target to-be-processed data from project management data corresponding to a target user based on the target filtering condition.

At S330, generate a personnel scheduling view based on a target project personnel identifier and schedule information corresponding to the target project personnel identifier in the target to-be-processed data.

In order to enable the target user to clearly know the personnel allocation situation through the personnel scheduling view, a total number of target project personnel and a project identifier of a project to which the target project personnel belong are further included on the page to which the personnel scheduling view belongs.

Figure 8:
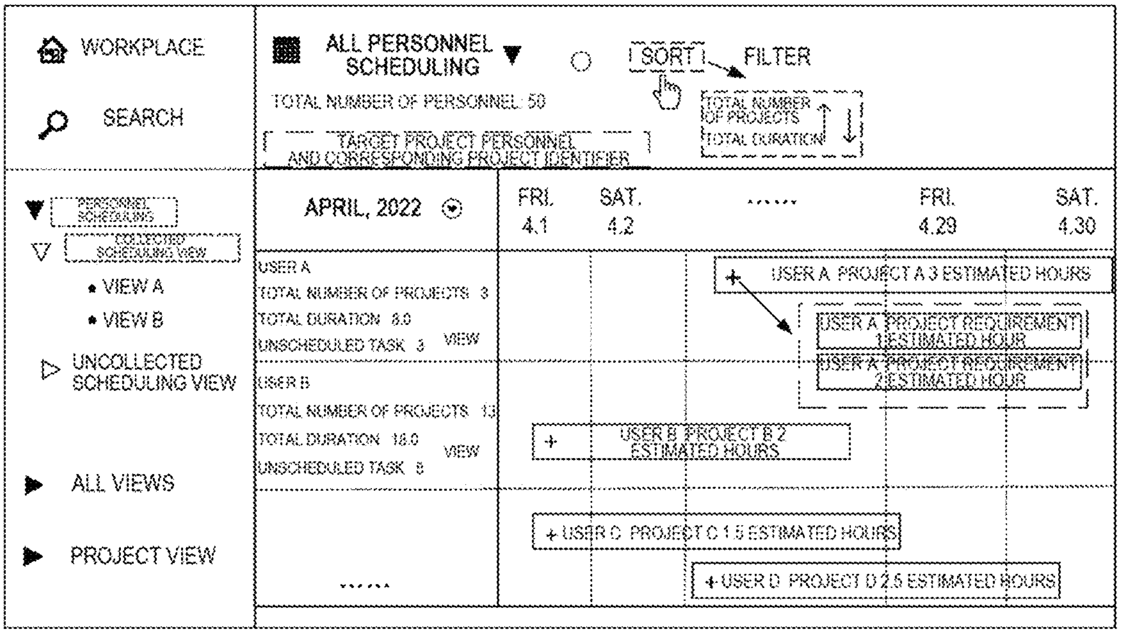
FIG. 8 is a schematic diagram illustrating schedule information provided by an embodiment of the present disclosure.

The total number of the target project personnel is the number of persons involved in the scheduling in the current personnel scheduling view, and the project identifier of the project to which the target project personnel belong may be embodied by the shown schedule information. For example, as shown in FIG. 8, the "total number of personnel" is displayed at the top of the view, which represents a total number of target project personnel participating in the scheduling in the current view; and a key "target project personnel and a corresponding project identifier" is also displayed, and by clicking the key, a project identifier corresponding to each user may be displayed, which is convenient for the target user to view. The project identifiers of the projects to which the target project personnel belong may be embodied in the schedule information shown by the personnel scheduling view. From the content "User A, project A, 3 estimated hours" shown in the horizontal bar in the figure, it can be known that the project identifier corresponding to the user A is project A, thus the correspondence between the target project person and the project identifier is clearly displayed.

In an embodiment, each piece of schedule information in the personnel scheduling view is represented in a chart form. The Gantt chart may intuitively reflect the relevant time information of the project, such as start time, a time length, and end time, by a position and a span of the cross bar representing a project on the time coordinate; the Gantt chart may include different image features such as solid bars or hollow bars, and different status of the project may be reflected by different image features; and the logical relationship among the projects may also be reflected by using a line with an arrow.

In this embodiment, the Gantt chart may reflect project content of the target project personnel, the target project personnel identifier, and estimated time of the project; and the start time of the cross bar of the Gantt chart may be determined according to the project start time set in the schedule information. The completion degree of the corresponding project can be reflected by transparency of cross bar of the Gantt chart. For example, it may be defined that the higher the completion degree of the project is, the larger the transparency is, in this way projects with low completion degree are highlighted more, which facilitates timely detection and accelerate promotion.

In an embodiment, the Gantt chart corresponding to each piece of schedule information may be decomposed into at least one project requirement, and when the number of project requirements is greater than or equal to the predetermined number, in order to save space, the display manner of each project requirement may be set as being hidden from display. For example, the predetermined number is 2, and when the number of the project requirements is greater than or equal to two, the requirements of respective projects may be hidden by folding.

A suspended window control can be arranged on the head of the Gantt chart, and the suspended window control is displayed in a distinguished way from the Gantt chart; where at least one project requirement is displayed in the suspended window control in a folded way, and the suspended window control can be distinguished from the Gantt chart in different aspects, such as color, shape and size, so that the suspended window control can be clearly viewed in the Gantt chart. For example, when the in the suspended window control is in a state of being triggered, a project requirement hidden from display may be shown in the corresponding project, and respective project requirements constitute corresponding schedule information.

In this embodiment, when it is detected that the suspended window control is triggered, at least one folded project requirement is displayed, where the schedule information corresponding to the at least one project requirement is represented based on a Gantt chart form.

By way of example, it may be set that, when the suspended window control is triggered, the folded project requirement is unfolded; and when the suspended window control is in a being triggered state, if the suspended window control is triggered again, it indicates that respective project requirements are transformed from the unfolded state to the folded state, and the project requirements continue to be hidden.

In this embodiment, when the at least one folded project requirement is displayed, all the project requirements may be directly displayed on the interface by using an enumeration display manner; when the number of the project requirements is relatively large, display of all the project requirements need to occupy a large area; in this case, a pull-down menu manner may be used to hide project requirements from display in the pull-down menu, and the project requirements are sequentially displayed by dragging a scroll bar. By way of example, the schedule information of each project requirement may be represented in a Gantt chart form, including information such as the requirement content of the target project personnel, the target project personnel identifier, and the estimated time for project requirements. The color of the Gantt chart may represent the completion status of the project requirements, such as red indicating being about to expire, green indicating completed, and yellow indicating in progress, and the completion degree of the project requirement may be reflected by the transparency of each color.

As shown in FIG. 8, the front end of each Gantt chart adopts a "+" identifier to represent a suspended window control, and a suspended window control with different shape states may be used to indicate an untriggered state and a triggered state; and the suspended window control in the being triggered state may be displayed with bold and enlarged "+", and the suspended window control in the untriggered state is displayed normally. The suspended window control is triggered by clicking on the "+" identifier or clicking a Gantt chart that the user wants to unfold, to unfold at least one folded project requirement. The Gantt chart corresponding to each user in FIG. 8 is in a row corresponding to a row header of the user, the project A includes two project requirements, each project requirement is still shown in the Gantt chart form, and at the same time, the requirement content of the target project personnel, the target project personnel identifier, and estimated time for project requirements are shown.

At S340, in response to detecting that a Gantt chart is dragged from a current position to a target position, determine a target project corresponding to the Gantt chart and a target schedule corresponding to the target position, and update a project execution flow corresponding to the target project based on the target schedule.

The target position and the current position belong to the same target project personnel identifier, and the target position is not scheduled. The target project is a project that needs to be completed within a time period corresponding to the current position, and the target schedule is a schedule scheduled during a time period corresponding to the target position in the personnel scheduling view.

In this embodiment, in the Gantt chart of the personnel scheduling view, the schedule information corresponding to the Gantt chart may be updated by changing the position of the Gantt chart, the length of cross bar and the like according to the actual application situation; for example, the cross bar of the Gantt chart is selected to be translated, the schedule may be modified to a new time range, and the start time of the corresponding schedule information is updated; and by dragging the left end and the right end of the cross bar of the Gantt chart, the duration may be prolonged/shorted or the schedule may be updated.

For example, when the target position and the current position belong to the same target project personnel identifier and the target position is not scheduled, it indicates that the target schedule is temporarily not scheduled; the operation of dragging the Gantt chart from the current position to the target position is equivalent to changing the start time of the target project when the duration of the target project, the target project personnel identifier, and the target project are unchanged, thereby changing the project execution flow; therefore, the project execution flow corresponding to the target project may be updated based on the target schedule. By dragging the Gantt chart, the convenience of updating the project execution flow is improved, and the execution sequence corresponding to the project execution flow can be vividly and intuitively understood.

Figure 9:
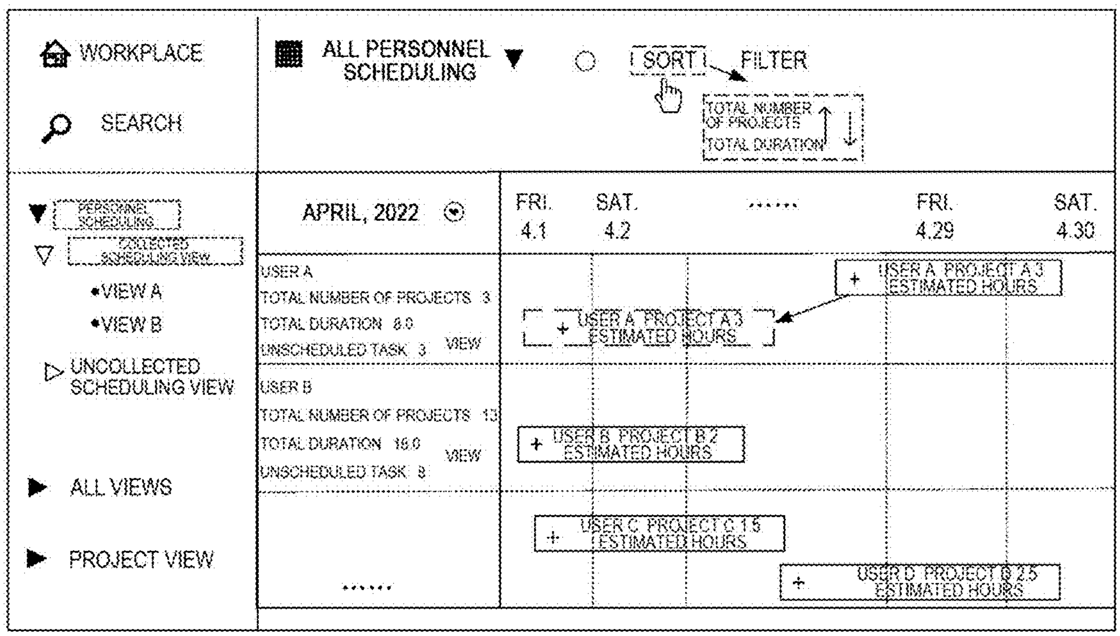
FIG. 9 is a schematic diagram illustrating an effect of dragging a Gantt chart provided by an embodiment of the present disclosure.

For example, the effect of dragging the Gantt chart is shown in FIG. 9, the start end of the arrow corresponds to the current position of the Gantt chart, the ending end of the arrow corresponds to the target position of the Gantt chart, and the Gantt chart after the movement is represented by a dotted line. It can be seen that, if the target project personnel identifier corresponding to the dragged Gantt map is still user A, and the target position is not scheduled, the project A that is originally completed during the time period corresponding to the current position can be changed to be completed in the time period corresponding to the target position, and the project execution flow is updated correspondingly, thus the linkage between the project execution flow and the personnel scheduling view is realized, and the operation convenience is improved.

In this embodiment, when the target position and the current position do not belong to the same target user identifier, the manner of updating the project execution flow may include: in response to detecting that a Gantt chart is dragged from a current position to a target position and the target position and the current position not belonging to a same target user identifier, determining a target project corresponding to the Gantt chart, and a target user identifier corresponding to the target position; and updating a project execution flow corresponding to the target project based on the Gantt chart and the target user identifier.

The target position is an unscheduled position; due to the fact that the user cannot complete multiple tasks simultaneously in the same time period, in order to improve the effectiveness and feasibility of the scheduling, a prompt window can be popped up when it is detected that a scheduling exists in the target position dragged by the Gantt chart, and a text box containing a typeface such as "Current time period has been scheduled, please reselect" is displayed to prompt the project management personnel.

Figure 10:
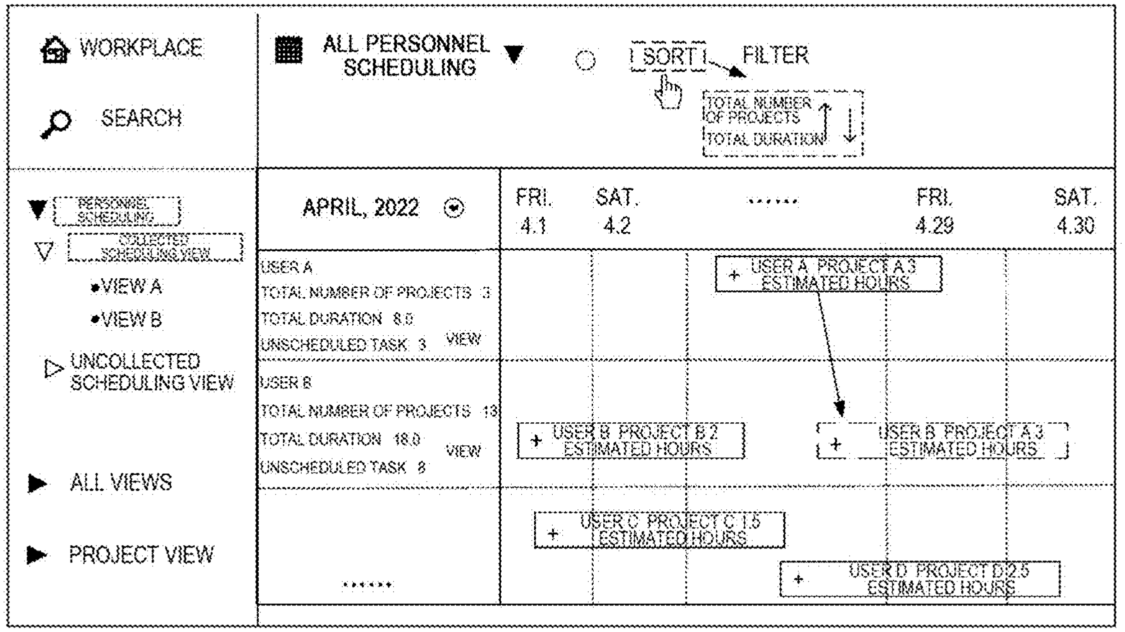
FIG. 10 is a schematic diagram illustrating another effect of dragging a Gantt chart provided by an embodiment of the present disclosure.

To illustrate the operation scenario of the Gantt chart of the present embodiment, as shown in FIG. 10, the Gantt chart in a row corresponding to the row header of the user A is dragged to a row corresponding to the row header of the user B, the target position is represented by a dotted line, it indicates that through the dragging operation on the Gantt chart, the target user identifier before and after the drag are inconsistent, and the project corresponding to the Gantt chart is executed by other users instead of the user A, and the target project corresponding to the dragged Gantt chart may be correspondingly determined as project A, and the target user identifier corresponding to the target position is the user B. Based on the above changes, the project execution flow is updated correspondingly; the original project execution flow is the user A executing project A in the time period corresponding to the current position, the updated project execution flow is deleting a task of user A at the current position, and adding the user B executing the task of the project A at the time period corresponding to the target position.

According to the technical solution provided by the embodiment of the present disclosure, the schedule information of the user is displayed in the Gantt chart form, the schedule information is more vivid, so that the time arrangement, the completion situation and the personnel allocation of the project can be clearly known by the target user; and through the dragging operation on the Gantt chart, the linkage operation with the project execution flow is realized, the flow arrangement in the project execution flow is updated correspondingly based on the dragged target position, and the convenience of updating the project execution flow is improved.

Figure 11:
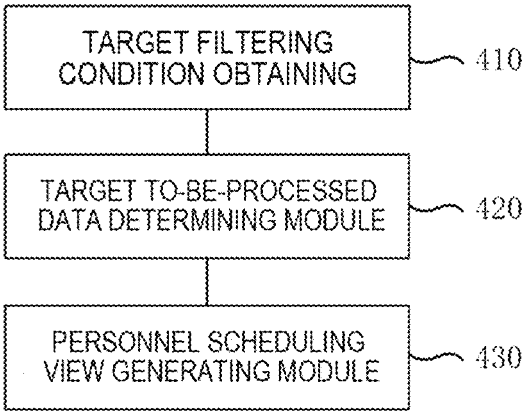
FIG. 11 is a structural block diagram of a view drawing apparatus provided by an embodiment of the present disclosure.

FIG. 11 is a structural block diagram illustrating a view drawing apparatus according to an embodiment of the present disclosure. The view drawing apparatus may perform the view drawing method provided by any embodiment of the present disclosure, and has corresponding function modules and effects for executing the method. As shown in FIG. 11, the apparatus includes a target filtering condition obtaining module 410, a target to-be-processed data determining module 420, and a personnel scheduling view generating module 430.

The target filtering condition obtaining module 410 is configured to obtain a target filtering condition in response to detecting that a view drawing control is triggered.

The target to-be-processed data determining module 420 is configured to determine target to-be-processed data from project management data corresponding to a target user based on the target filtering condition, wherein the project management data comprises to-be-processed data corresponding to at least one project, and the to-be-processed data comprises project personnel information.

The personnel scheduling view generation module 430 is configured to generate a personnel scheduling view based on a target project personnel identifier and schedule information corresponding to the target project personnel identifier in the target to-be-processed data.

Based on the foregoing technical solutions, the target filtering condition includes at least one of a project name, a time period, a schedule user, a user identifier, and a role type.

On the basis of the foregoing technical solutions, the apparatus further includes a filtering condition editing page popup module and a text content obtaining module, where, the filtering condition editing page popup module is configured to, after detecting the view drawing control being triggered and before obtaining the target filtering condition, in response to detecting that a personnel scheduling control on a display interface is triggered, pop up a filtering condition editing page, wherein the filtering condition editing page comprises at least one editing control.

the text content obtaining module is configured to obtain text content edited in the at least one editing control, and generate the target filtering condition based on the text content.

Based on the foregoing technical solutions, the apparatus further includes a personnel scheduling view option showing module and a personnel scheduling view displaying module, where, the personnel scheduling view option showing module is configured to unfold at least one collected personnel scheduling view option that is hidden from display in response to detecting that a folding control corresponding to the personnel scheduling control is triggered.

a personnel scheduling view displaying module configured to display a collected personnel scheduling view based on a triggering operation for the at least one collected personnel scheduling view option.

Based on the foregoing technical solutions, the personnel scheduling view generating module 430 includes an information obtaining unit, a row header determining unit, and a personnel scheduling view generating unit, where, the information obtaining unit is configured to obtain a target project personnel identifier, project information, and schedule information in the target to-be-processed data.

the row header determining unit is configured to take the date information as a column header of the personnel scheduling view, and take at least one target project personnel identifier as a row header of the personnel scheduling view;

the personnel scheduling view generating unit is configured to generate the personnel scheduling view based on the row header, the column header, and the schedule information.

Based on the foregoing technical solutions, the row header further includes:

the total number of projects in which target project personnel participate, a total duration of the schedule information, and the number of unscheduled projects.

Based on the foregoing technical solutions, a page to which the personnel scheduling view belongs further includes the total number of target project personnel and a project identifier of a project to which the target project personnel belong.

Based on the foregoing technical solutions, the apparatus further includes:

a personnel scheduling view updating module is configured to, when detecting a sort control, determine the number of displayed rows of each piece of row data in the personnel scheduling view based on a total duration or the total number of projects corresponding to a row header in the personnel scheduling view, so as to update the personnel scheduling view.

Based on the above technical solutions, each piece of schedule information in the personnel scheduling view is represented in a Gantt chart form.

Based on the above technical solutions, t a head of the Gantt chart is provided with a suspended window control, and the suspended window control is displayed differently from the Gantt chart;

At least one project requirement is shown in a folded manner in the suspended window control.

Based on the foregoing technical solutions, the apparatus further includes:

a project requirement display module, configured to, in response to detecting that the suspended window control is triggered, display the folded at least one project requirement;

schedule information corresponding to the at least one project requirement is represented based on a Gantt chart form.

Based on the foregoing technical solutions, the apparatus further includes a target schedule determining module and a first project execution flow updating module, where, the target schedule determining module is configured to, in response to detecting that a Gantt chart is dragged from a current position to a target position, determine a target project corresponding to the Gantt chart and a target schedule corresponding to the target position; and the first project execution flow updating module is configured to update a project execution flow corresponding to the target project based on the target schedule.

the target position and the current position belong to a same target project personnel identifier, and the target position is not scheduled.

Based on the foregoing technical solutions, the apparatus further includes a target project determining module and a second project execution flow determining module, where, the target project determining module is configured to: when it is detected that detecting a Gantt chart being dragged from a current position to a target position and the target position and the current position not belonging to a same target user identifier, determine a target project corresponding to the Gantt chart, and a target user identifier corresponding to the target position;

the second project execution flow determining module is configured to a project execution flow corresponding to the target project based on the Gantt chart and the target user identifier.

According to the technical solution of the embodiment of the present disclosure, when detecting that a view drawing control is triggered, it is indicated that a drawing function for the personnel scheduling view needs to be enabled, the target filtering condition can be obtained, target to-be-processed data is determined from project management data corresponding to the target user according to the target filtering condition, so that support data required for generating the personnel scheduling view is obtained, and the to-be-processed data does not need to be manually imported; wherein the project management data includes the to-be-processed data corresponding to the at least one project, the to-be-processed data includes project personnel information, the target project personnel information can be determined through the target to-be-processed data, the target project personnel information may include the target project personnel identifier and the schedule information corresponding to the target project personnel identifier, and the personnel scheduling view can be quickly generated based on the target project personnel identifier and the schedule information corresponding to the target project personnel identifier in the target to-be-processed data. According to the embodiment of the present disclosure, the problem of laborious and time-consuming in the related technology is solved, and the effect of efficiently and quickly generating a personnel scheduling view is realized.

The view drawing apparatus provided by the embodiments of the present disclosure may perform the view drawing method provided by any embodiment of the present disclosure, and has function modules and effects corresponding to the execution method.

A plurality of units and modules included in the foregoing apparatus are divided only according to function logic, but are not limited to the foregoing division, as long as a corresponding function can be implemented; in addition, names of the plurality of function units are merely used to facilitate mutual differentiation, and are not intended to limit the protection scope of the embodiments of the present disclosure.

Figure 12:
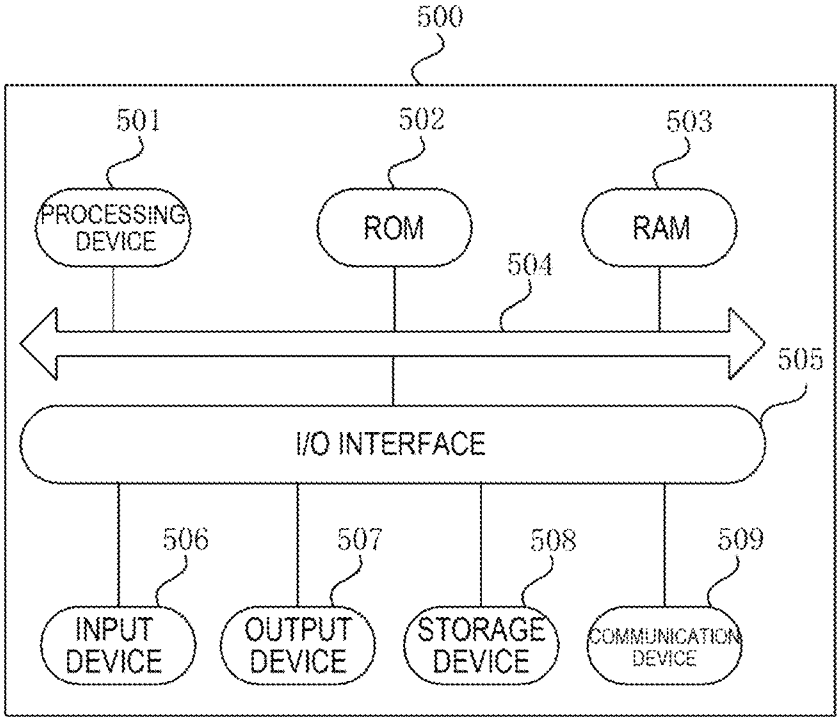
FIG. 12 is a schematic structural diagram of an electronic device provided by an embodiment of the present disclosure.

FIG. 12 is a schematic structural diagram illustrating an electronic device according to a fifth embodiment of the present disclosure. FIG. 12 is a schematic structural diagram of an electronic device (such as the terminal device or server in FIG. 12) 500 suitable for implementing the embodiments of the present disclosure. The terminal device in the embodiments of the present disclosure may include a mobile terminal such as a mobile phone, a notebook computer, a digital broadcast receiver, a personal digital assistant (PDA), a tablet computer (PAD), a portable multimedia player (PMP), an in-vehicle terminal (for example, an in-vehicle navigation terminal), and a fixed terminal such as a digital television (TV), a desktop computer, or the like. The electronic device shown in FIG. 12 is merely an example, there is no limitation to the function and usage scope of the embodiments of the present disclosure.

As shown in FIG. 12, the electronic device 500 may include a processing device (for example, a central processing unit, a graphics processor, etc.) 501, which may perform various appropriate actions and processing according to a program stored in a read-only memory (ROM) 502 or a program loaded into a random-access memory (RAM) 503 from a storage device 508. In the RAM 503, various programs and data required by operation of the electronic device 500 are also stored. The processing device 501, the ROM 502, and the RAM 503 are connected to each other through a bus 504. An input/output (I/O) interface 505 is also connected to the bus 504.

The following devices can be connected to I/O interface 505: input devices 506 including, for example, touch screens, touchpads, keyboards, mice, cameras, microphones, accelerometers, gyroscopes, etc.; output devices 507 including liquid crystal displays (LCDs), speakers, vibrators, etc.; storage devices 508 including magnetic tapes, hard disks, etc.; and a communication device 509. The communication device 509 may allow the electronic device 500 to communicate with other devices wirelessly or wirelessly to exchange data. Although FIG. 12 shows an electronic device 500 with various devices, it is not required to implement or have all the devices shown. More or fewer devices can be implemented or provided instead.

According to an embodiment of the present disclosure, the process described above with reference to the flowchart can be implemented as a computer software program. For example, an embodiment of the present disclosure includes a computer program product that includes a computer program carried on a non-transitory computer-readable medium, where the computer program includes program code for performing the method shown in the flowchart. In such an embodiment, the computer program can be downloaded and installed from a network through the communication device 509, or installed from the storage device 508, or installed from the ROM 502. When the computer program is executed by the processing device 501, the above functions defined in the method of the embodiment of the present disclosure are performed.

The names of messages or information interaction between multiple devices in embodiments of the present disclosure are for illustrative purposes only and are not intended to limit the scope of such messages or information.

The electronic device provided by the embodiments of the present disclosure and the view drawing method provided in the foregoing embodiments belong to the same concept, and technical details not described in detail in this embodiment may refer to the foregoing embodiments, and this embodiment has the same effect as the foregoing embodiments.

An embodiment of the present disclosure provides a computer storage medium having a computer program stored thereon, the computer program, when executed by a processor, implements the view drawing method provided in the foregoing embodiments.

The computer-readable medium described above can be a computer-readable signal medium or a computer-readable storage medium, or any combination thereof. The computer-readable storage medium can be, for example, an electrical, magnetic, optical, electromagnetic, infrared, or semiconductor system, apparatus, or device, or any combination thereof. Examples of computer-readable storage media may include: an electrical connection with one or more wires, a portable computer disk, a hard disk, RAM, ROM, an Erasable Programmable Read-Only Memory (EPROM) or flash memory, an optical fiber, a portable Compact Disk Read-Only Memory (CD-ROM), an optical storage device, a magnetic storage device, or any suitable combination thereof. In the present disclosure, a computer-readable storage medium may be tangible medium containing or storing a program that can be used by an instruction execution system, apparatus, or device, or can be used in combination with an instruction execution system, apparatus, or device. In the present disclosure, a computer-readable signal medium can include a data signal propagated in baseband or as part of a carrier wave, which carries computer-readable program code therein. Such propagated data signals may take many forms, including electromagnetic signals, optical signals, or any suitable combination thereof. A computer-readable signal medium may also be any computer-readable medium other than a computer-readable storage medium, which can send, propagate, or transmit programs for use by or in conjunction with instruction execution systems, apparatus, or devices. The program code contained on the computer-readable medium may be transmitted using any suitable medium, including: wires, optical cables, radio frequency (RF), etc., or any suitable combination thereof.

In some embodiments, clients and servers can communicate using any currently known or future developed network protocol such as Hypertext Transfer Protocol (HTTP), and can be interconnected with any form or medium of digital data communication (such as communication networks). Examples of communication networks include Local Area Networks ("LANs"), Wide Area Networks ("WANs"), internetworks (such as the Internet), and end-to-end networks (such as ad hoc end-to-end networks), as well as any currently known or future developed networks.

The computer-readable medium can be included in the electronic device, or it can exist alone without being assembled into the electronic device.

The above-mentioned computer-readable medium carries one or more programs, and when the above-mentioned one or more programs are executed by the electronic device, the electronic device: obtain a target filtering condition in response to detecting that a view drawing control is triggered;

determine target to-be-processed data from project management data corresponding to a target user based on the target filtering condition, wherein the project management data comprises to-be-processed data corresponding to at least one project, and the to-be-processed data comprises project personnel information; and generate a personnel scheduling view based on a target project personnel identifier and schedule information corresponding to the target project personnel identifier in the target to-be-processed data.

Computer program codes for performing the operations of the present disclosure may be written in one or more programming languages or a combination thereof, including Object Oriented programming languages—such as Java, Smalltalk, C++, and also conventional procedural programming languages—such as "C" or similar programming languages. The program code may be executed entirely on the user's computer, partially executed on the user's computer, executed as a standalone software package, partially executed on the user's computer and partially on a remote computer, or entirely on a remote computer or server. In the case of involving a remote computer, the remote computer may be any kind of network—including LAN or WAN—connected to the user's computer, or may be connected to an external computer (e.g., through an Internet service provider to connect via the Internet).

The flowcharts and block diagrams in the accompanying drawings illustrate the architecture, functions, and operations of possible implementations of the system, method, and computer program product according to various embodiments of the present disclosure. In this regard, each block in a flowchart or block diagram may represent a module, program segment, or portion of code that contains one or more executable instructions for implementing a specified logical function. In some alternative implementations, the functions marked in the blocks may occur in a different order than those marked in the drawings. For example, two consecutive blocks may actually be executed in parallel, or they may sometimes be executed in reverse order, depending on the function involved. Each block in the block diagrams and/or flowcharts, as well as combinations of blocks in the block diagrams and/or flowcharts, may be implemented using a dedicated hardware-based system that performs the specified function or operations, or may be implemented using a combination of dedicated hardware and computer instructions.

The units described in the embodiments of the present disclosure may be implemented by means of software or hardware. The name of the unit does not constitute a limitation on the unit itself in a certain case.

The functions described herein above can be performed at least in part by one or more hardware logic components. For example, example types of hardware logic components that may be used include: Field Programmable Gate Arrays (FPGAs), Application Specific Integrated Circuits (ASICs), Application Specific Standard Parts (ASSPs), System on Chip (SOCs), Complex Programmable Logic Devices (CPLDs), and so on.

In the context of this disclosure, a machine-readable medium can be a tangible medium that may contain or store programs for use by or in conjunction with instruction execution systems, apparatuses, or devices. A machine-readable medium may be a machine-readable signal medium or a machine-readable storage medium. A machine-readable medium may include, but are not limited to, electronic, magnetic, optical, electromagnetic, infrared, or semiconductor systems, apparatuses, or devices, or any suitable combination thereof. Specific examples of the machine-readable storage medium may include electrical connections based on one or more wires, portable computer disks, hard disks, RAM, ROM, an EPROM or flash memory, an optical fiber, a portable CD-ROM, optical storage devices, magnetic storage devices, or suitable combination thereof. The storage medium may be a non-transitory storage medium.

According to one or more embodiments of the present disclosure, [Example 1] provides a view drawing method, including:

in response to detecting that a view drawing control is triggered, obtaining a target filtering condition;

determining target to-be-processed data from project management data corresponding to a target user based on the target filtering condition, wherein the project management data comprises to-be-processed data corresponding to at least one project, and the to-be-processed data comprises project personnel information; and generating a personnel scheduling view based on a target project personnel identifier and schedule information corresponding to the target project personnel identifier in the target to-be-processed data.

According to one or more embodiments of the present disclosure, [Example 2] provides a view drawing method, further including:

optionally, the target filtering condition comprises at least one of a project name, a time period, a schedule user, a user identifier, and a role type.

According to one or more embodiments of the present disclosure, [Example 3] provides a view drawing method, further including:

optionally, in response to detecting that a personnel scheduling control on a display interface is triggered, popping up a filtering condition editing page, wherein the filtering condition editing page comprises at least one editing control; and obtaining text content edited in the at least one editing control, and generating the target filtering condition based on the text content.

According to one or more embodiments of the present disclosure, [Example 4] provides a view drawing method, further including:

optionally, in response to detecting that a folding control corresponding to the personnel scheduling control is triggered, unfolding at least one collected personnel scheduling view option that is hidden from display; and displaying a collected personnel scheduling view based on a triggering operation for the at least one collected personnel scheduling view option.

According to one or more embodiments of the present disclosure, [Example 5] provides a view drawing method, further including:

optionally, obtaining the target project personnel identifier and the schedule information in the target to-be-processed data;

taking date information as a column header of the personnel scheduling view, and taking at least one target project personnel identifier as a row header of the personnel scheduling view; and generating the personnel scheduling view based on the row header, the column header and the schedule information.

According to one or more embodiments of the present disclosure, [Example 6] provides a view drawing method, further including:

optionally, the row header further includes the total number of projects in which target project personnel participate, a total duration of the schedule information, and the number of unscheduled projects.

According to one or more embodiments of the present disclosure, [Example 7] provides a view drawing method, further including:

Optionally, a page to which the personnel scheduling view belongs further including the total number of target project personnel and a project identifier of a project to which the target project personnel belong.

According to one or more embodiments of the present disclosure, [Example 8] provides a view drawing method, further including:

in response to detecting a sort control, determining the number of displayed rows of each piece of row data in the personnel scheduling view based on a total duration or the total number of projects corresponding to a row header in the personnel scheduling view, so as to update the personnel scheduling view.

According to one or more embodiments of the present disclosure, [Example 9] provides a view drawing method, further including:

optionally, each piece of schedule information in the personnel scheduling view is represented in a Gantt chart form.

According to one or more embodiments of the present disclosure, [Example 10] provides a view drawing method, further including:

optionally, a head of the Gantt chart is provided with a suspended window control, and the suspended window control is displayed differently from the Gantt chart;

wherein at least one project requirement is shown in a folded manner in the suspended window control.

According to one or more embodiments of the present disclosure, [Example 11] provides a view drawing method, further including:

optionally, in response to detecting that the suspended window control is triggered, displaying the folded at least one project requirement;

wherein schedule information corresponding to the at least one project requirement is represented based on a Gantt chart form.

According to one or more embodiments of the present disclosure, [Example 12] provides a view drawing method, further including:

Optionally, in response to detecting that a Gantt chart is dragged from a current position to a target position, determining a target project corresponding to the Gantt chart and a target schedule corresponding to the target position;

updating a project execution flow corresponding to the target project based on the target schedule;

wherein the target position and the current position belong to a same target project personnel identifier, and the target position is not scheduled.

According to one or more embodiments of the present disclosure, [Example 13] provides a view drawing method, further including:

in response to detecting that a Gantt chart is dragged from a current position to a target position and the target position and the current position not belonging to a same target user identifier, determining a target project corresponding to the Gantt chart, and a target user identifier corresponding to the target position; and updating a project execution flow corresponding to the target project based on the Gantt chart and the target user identifier.

According to one or more embodiments of the present disclosure, [Example 14] provides a view drawing method, further including:

a target filtering condition obtaining module, configured to obtain a target filtering condition in response to detecting that a view drawing control is triggered;

a target to-be-processed data determining module, configured to determine target to-be-processed data from project management data corresponding to a target user based on the target filtering condition, wherein the project management data comprises to-be-processed data corresponding to at least one project, and the to-be-processed data comprises project personnel information; and a personnel scheduling view generating module, configured to generate a personnel scheduling view based on a target project personnel identifier and schedule information corresponding to the target project personnel identifier in the target to-be-processed data.

In addition, although a plurality of operations are depicted in a specific order, this should not be understood as requiring these operations to be performed in the specific order shown or in a sequential order. In certain environments, multitasking and parallel processing may be advantageous. Similarly, although a plurality of implementation details are included in the above discussion, these should not be construed as limiting the scope of the present disclosure. Some features described in the context of individual embodiments can also be implemented in combination in a single embodiment. Conversely, a plurality of features described in the context of a single embodiment can also be implemented in a plurality of embodiments separately or in any suitable sub-combination.

Although the subject matter has been described in language specific to structural features and/or methodological logical actions, it should be understood that the subject matter defined in the appended claims is not necessarily limited to the specific features or actions described above. On the contrary, the specific features and actions described above are merely example forms of implementing the claims.

We claim:

1. A method for automatically drawing views, comprising:

in response to detecting that a view drawing control is triggered on a graphical user interface of an application, obtaining a filtering condition, wherein the filtering condition comprises at least one of a time period, a schedule user, a user identifier, and a role type;

filtering project management data corresponding to a user based on the filtering condition to automatically determine to-be-processed data without receiving user input identifying the to-be-processed data, wherein the project management data comprises data corresponding to at least one project, and wherein the to-be-processed data comprises project personnel information; and displaying a personnel scheduling view on the graphical user interface of the application, wherein the personnel scheduling view is automatically generated based on a project personnel identifier and schedule information corresponding to the project personnel identifier in the to-be-processed data, wherein the project personnel identifier is a row header of the personnel scheduling view, and wherein date information included in the schedule information is a column header of the personnel scheduling view.

2. The method of claim 1, wherein a page to which the personnel scheduling view belongs further comprises the total number of project personnel and a project identifier of a project to which the project personnel belong.

3. The method of claim 1, wherein the method further comprises:

after detecting the view drawing control being triggered and before obtaining the filtering condition, in response to detecting that a personnel scheduling control on a display interface is triggered, popping up a filtering condition editing page, wherein the filtering condition editing page comprises at least one editing control; and obtaining text content edited in the at least one editing control, and generating the filtering condition based on the text content.

4. The method of claim 1, further comprising:

in response to detecting that a folding control corresponding to the personnel scheduling control is triggered, unfolding at least one collected personnel scheduling view option that is hidden from display; and displaying a collected personnel scheduling view based on a triggering operation for the at least one collected personnel scheduling view option.

5. The method of claim 1, further comprising:

in response to detecting a sort control, determining the number of displayed rows of each piece of row data in the personnel scheduling view based on a total duration or the total number of projects corresponding to a row header in the personnel scheduling view, so as to update the personnel scheduling view.

6. The method of claim 1, further comprising:

in response to detecting that a Gantt chart is dragged from a current position to a different position, determining a project corresponding to the Gantt chart and a schedule corresponding to the different position; and updating a project execution flow corresponding to the project based on the schedule;

wherein the different position and the current position belong to a same project personnel identifier, and the different position is not scheduled.

7. The method of claim 1, further comprising:

in response to detecting that a Gantt chart is dragged from a current position to a different position and the different position and the current position not belonging to a same user identifier, determining a project corresponding to the Gantt chart, and a user identifier corresponding to the different position; and updating a project execution flow corresponding to the project based on the Gantt chart and the user identifier.

8. The method of claim 1, wherein generating the personnel scheduling view based on the project personnel identifier and the schedule information corresponding to the project personnel identifier in the to-be-processed data comprises:

obtaining the project personnel identifier and the schedule information in the to-be-processed data;

and generating the personnel scheduling view based on the row header, the column header and the schedule information.

9. The method of claim 8, wherein the row header further comprises:

the total number of projects in which project personnel participate, a total duration of the schedule information, and the number of unscheduled projects.

10. The method of claim 1, wherein each piece of schedule information in the personnel scheduling view is represented in a Gantt chart form.

11. The method of claim 10, wherein a head of the Gantt chart is provided with a suspended window control, and the suspended window control is displayed differently from the Gantt chart;

wherein at least one project requirement is shown in a folded manner in the suspended window control.

12. The method of claim 11, further comprising:

in response to detecting that the suspended window control is triggered, displaying the folded at least one project requirement;

wherein schedule information corresponding to the at least one project requirement is represented based on a Gantt chart form.

13. An electronic device, comprising:

one or more processors; and a storage device configured to store one or more programs, wherein the one or more programs, when executed by the one or more processors, cause the one or more processors to perform acts comprising:

in response to detecting that a view drawing control is triggered on a graphical user interface of an application, obtaining a filtering condition, wherein the filtering condition comprises at least one of a time period, a schedule user, a user identifier, and a role type;

filtering project management data corresponding to a user based on the filtering condition to automatically determine to-be-processed data without receiving user input identifying the to-be-processed data, wherein the project management data comprises data corresponding to at least one project, and wherein the to-be-processed data comprises project personnel information; and displaying a personnel scheduling view on the graphical user interface of the application, wherein the personnel scheduling view is automatically generated based on a project personnel identifier and schedule information corresponding to the project personnel identifier in the to-be-processed data, wherein the project personnel identifier is a row header of the personnel scheduling view, and wherein date information included in the schedule information is a column header of the personnel scheduling view.

14. The electronic device of claim 13, wherein the acts further comprise: after detecting the view drawing control being triggered and before obtaining the filtering condition, in response to detecting that a personnel scheduling control on a display interface is triggered, popping up a filtering condition editing page, wherein the filtering condition editing page comprises at least one editing control; and obtaining text content edited in the at least one editing control, and generating the filtering condition based on the text content.

15. The electronic device of claim 13, wherein the acts further comprise:

in response to detecting that a folding control corresponding to the personnel scheduling control is triggered, unfolding at least one collected personnel scheduling view option that is hidden from display; and displaying a collected personnel scheduling view based on a triggering operation for the at least one collected personnel scheduling view option.

16. The electronic device of claim 13, wherein generating the personnel scheduling view based on the project personnel identifier and the schedule information corresponding to the project personnel identifier in the to-be-processed data comprises:

obtaining the project personnel identifier and the schedule information in the to-be-processed data;

and generating the personnel scheduling view based on the row header, the column header and the schedule information.

17. The electronic device of claim 13, wherein a page to which the personnel scheduling view belongs further comprises the total number of project personnel and a project identifier of a project to which the project personnel belong.

18. A non-transitory computer-readable storage medium having a computer program stored thereon, wherein the computer program, when executed by a processor, causes the processor to perform acts comprising:

in response to detecting that a view drawing control is triggered on a graphical user interface of an application, obtaining a filtering condition, wherein the filtering condition comprises at least one of a time period, a schedule user, a user identifier, and a role type;

filtering project management data corresponding to a user based on the filtering condition to automatically determine to-be-processed data without receiving user input identifying the to-be-processed data, wherein the project management data comprises data corresponding to at least one project, and wherein the to-be-processed data comprises project personnel information; and displaying a personnel scheduling view on the graphical user interface of the application, wherein the personnel scheduling view is automatically generated based on a project personnel identifier and schedule information corresponding to the project personnel identifier in the to-be-processed data, wherein the project personnel identifier is a row header of the personnel scheduling view, and wherein date information included in the schedule information is a column header of the personnel scheduling view.

* * * * *